United States Patent [19]

Austin

[11] Patent Number: 4,944,007
[45] Date of Patent: Jul. 24, 1990

[54] PUBLIC KEY DIVERSIFICATION METHOD

[75] Inventor: Jeffrey R. Austin, Hindhead, England

[73] Assignee: NCR Corporation, Dayton, Ohio

[21] Appl. No.: 364,949

[22] Filed: Jun. 12, 1989

[30] Foreign Application Priority Data

Aug. 19, 1988 [GB] United Kingdom ............... 8819767

[51] Int. Cl.$^5$ .......................... H04L 9/08; H04L 9/30
[52] U.S. Cl. ....................................... 380/21; 380/30; 380/46
[58] Field of Search ............................ 380/21, 22-25, 380/30, 44, 46

[56] References Cited

U.S. PATENT DOCUMENTS

| | | | |
|---|---|---|---|
| 4,349,695 | 9/1982 | Morgan et al. | 380/25 |
| 4,405,829 | 9/1983 | Rivest et al. | 380/30 |
| 4,424,414 | 1/1984 | Hellman et al. | 380/30 |
| 4,471,164 | 9/1984 | Henry | 380/30 |
| 4,720,859 | 1/1988 | Aaro et al. | 380/23 |
| 4,797,920 | 1/1989 | Stein | 380/24 |

FOREIGN PATENT DOCUMENTS 0252499 1/1988 European Pat. Off. .

OTHER PUBLICATIONS

Rivest et al, "A Method for Obtaining Digital Signatures and Public-Key Cryptosystems"; "Communications of the ACM "(2/78; vol. 21, No. 2; pp. 120-126).
N.E.C. Research & Development, No. 71, Oct. 1983 (Tokyo, JP), K. Itakura et al., "A Public-Key Cryptosystem Suitable for Digital Multisignatures", pp. 1-8, see p. 4, left-hand column, line 7-last line; right-hand column, lines 10-12, line 28-last line; p. 5, left-hand column, line 31-last line; and Review of the Electrical Communication Laboratories, vol. 32, No. 5, Sep. 1984 (Tokyo, JP), K. Koyama: "Encrypted Broadcast Communication Using Public Master Key", pp. 869-876, see p. 872, right-hand column, line 7-p. 873, left-hand column, line 6.

Primary Examiner—Stephen C. Buczinski
Assistant Examiner—Bernarr Earl Gregory
Attorney, Agent, or Firm—Wilbert Hawk, Jr.; Stephen F. Jewett; Douglas S. Foote

[57] ABSTRACT

A method is disclosed whereby individual members of a group of members or entities may be provided, under the control of a trusted member, referred to as the parent, with respective individual secret keys for use in public key cryptography, such that the matching public key can be readily derived, and group membership authenticated. The parent initially establishes a public key (e,N) where N=P.Q is the product of two primes. In response to a request from a group member, the parent selects two further primes R,S and communicates two values dependent thereon to the requesting member, which selects two more primes T and U for use in conjunction with the received values to establish the member's secret key.

8 Claims, 7 Drawing Sheets

PUBLIC KEY DIVERSIFICATION METHOD

This invention relates to public key cryptography. More particularly, it relates to a method for generating key values for use in public key cryptography.

BACKGROUND OF THE INVENTION

This invention is related to U.S. Pat. Application Ser. No. 331,788 filed Apr. 3, 1989.

Public key cryptography is described, for example, in the article: Communications of the ACM, vol. 21, No. 2, February 1978, pages 120-126, R. L. Rivest et al: "A Method for Obtaining Digital Signatures and Public-Key Cryptosystems". Briefly, in public key cryptography, a message is encrypted by representing it as a number M, raising M to a publicly specified power e, and then taking the remainder when the result is divided by a publicly specified product N, of two large secret prime numbers P and Q. Decryption is similar, except that a different, secret, power d is used, where $$e \cdot d = 1 \ (\text{mod} \ (P-1) \cdot (Q-1)). \tag{1a}$$

For example, the remainder (which is the encoded message) is raised to the power d and divided by N. The remainder from this division is the original message.

A further feature of such a system is that messages can be "signed" using the secretly held decryption key d, and anyone can verify this signature using the publicly revealed encryption key e.

More particularly, if N is the product of two prime numbers P, Q, i.e., if $$N = P \cdot Q;$$

and if e is relatively prime to $\Phi(N)$, where $$\Phi(N) = (P-1) \cdot (Q-1)$$

is Euler's totient function of N (the number of integers less than N which are relatively prime to N), then, in modulus N arithmetic, a value d can be determined (see for example, the aforementioned article by Rivest et al) which is the multiplicative inverse of e such that $$e \cdot d = 1 \ (\text{mod} \ \Phi(N)).$$

The value d is commonly referred to as the secret key counterpart of the public key e.

Thus, if $$X = Y^e \ (\text{mod} \ N),$$

then $$Y = X^d \ (\text{mod} \ N)$$

for all values of Y, $0 \leq Y < N$.

As mentioned above, this knowledge has been employed in the art of cryptography to design various ciphering systems where typically the integers e and N are disclosed to parties of the cryptographic sessions as a public ciphering key and the integer d is held by the party originating the keys as a secret key value.

Users of these techniques may therefore encipher data Y using the public key (e, N) in reasonable knowledge that only the holder of the secret key value d may decipher the data Y.

Similarly the holder of the secret key value d may encipher data X using (d, N) so that any party with knowledge of the public key values (e, N) may determine that only the holder of the secret key value d could have been the source of data X.

These procedures permit users of the technique to encipher sensitive data and also to digitally sign that data to authenticate its source.

The security of such a system depends in part on the difficulty of factoring the publicly specified value N. In order to prevent N from being factored, a value N is formed from the product of two very large prime numbers P and Q. For example, selecting P, $Q > 2^{150}$ should prevent N from being factored by any presently known method.

The proof of the aforementioned relationships will now be established.

Given that $$N = P \cdot Q$$

and $$e \cdot d = 1 \ \text{mod} \ \Phi(N) \tag{1b}$$

where both P and Q are prime integers, then $$\Phi(N) = \Phi(P) \cdot \Phi(Q) = (P-1) \cdot (Q-1).$$

It will be shown that, if $$X = Y^e \ (\text{mod} \ N) \tag{2}$$

then $$Y = Y^d \ (\text{mod} \ N). \tag{3}$$

Note that if (3) is true, then from (2)

$$X = Y^{e \cdot d} \ (\text{mod} \ N)$$

From (1b), $X^{e \cdot d} = X^{1 + K\Phi(N)}$ (mod N) where K is some integer.

Since P is prime, it is known (Fermat's "little" theorem) that $$X^{P-1} = 1 \ (\text{mod} \ P) \ \text{for all} \ X, \ 0 < X < P.$$

Therefore since $P-1$ divides $\Phi(N) = (P-1) \cdot (Q-1)$ $$X^{1 + K\Phi(N)} = X \ (\text{mod} \ P) \ \text{for all} \ X, \ 0 \leq X < P. \tag{4}$$

Similarly, since Q is prime $$X^{1 + K\Phi(N)} = X \ (\text{mod} \ Q) \ \text{for all} \ X, \ 0 \leq X < Q. \tag{5}$$

Equations (4) and (5) imply that $$X^{1 + K\Phi(N)} = X \ (\text{mod} \ P \cdot Q) \ \text{for all} \ X, \ 0 \leq X < N,$$

i.e.

$$X = Y^e = X^{e \cdot d} = X^{1 + K\Phi(N)} = X \ (\text{mod} \ N)$$

Therefore, if $$X = Y^e \ (\text{mod} \ N)$$

then $$Y = X^d \pmod{N}$$

for all Y, $0 \leq Y < N$.

Public key cryptography has particular application to "smart" cards employed as credit and other transaction cards. The microprocessor on a smart card enables it to perform the data calculations associated with public key cryptography. Typically, the secret key d,N is embedded in the card by the card issuer and the public key e,N is made available to various authenticators such as merchants' card readers. To authenticate a card, the authenticator encrypts a message with the public key and the card "proves" its authenticity by decrpyting the encrypted message with its private key. In addition, messages sent from the card may be "signed" by encrypting them first with the private key.

Large international transaction card associations may have many card issuing members. Each card issuing member, such as a bank, will desire that its cards be able to prove the authenticity of its membership in the association. This may be achieved, as described above, by the use of a secret key on each card which corresponds to a public key available to authenticators. However, each member may further desire to issue cards with its own personalized secret key which is unknown to other members. This will allow the issuing member to distinguish itself from other members of the association and prevent other members from masquerading as the issuing member. However, the issuing member does not wish to lose its identity as a member of the association. Furthermore, it is desirable to have the personalized secret key be readily usable with the public key but be unknown to the association.

OBJECTS OF THE INVENTION

It is therefore an object of the present invention to provide a new and improved method of generating key values for use in public key cryptography.

It is another object of the present invention to provide a method by which any member of a group consisting of a plurality of members or entities may be provided with a secret key for the purpose of deciphering data or digitally signing data, which secret key is known to that member only.

It is a further object of the present invention to provide a method for providing a member of a group with a secret key where the matching public key can be easily derived by any entity (whether or not a group member).

It is yet another object of the present invention to provide a method for providing members of a group with individual secret keys whereby it can be verified that any member using its secret key is a legitimate member of the group.

SUMMARY OF THE INVENTION

Therefore, according to the present invention, there is provided a method of generating key values for use in public key cryptography by a requesting entity, including the step of generating at a parent entity, a public key N, e, where the modulus N is the product of first and second prime numbers P,Q and e is a corresponding public key integer value. The method includes selecting third and fourth prime numbers R,S and transmitting to the requesting entity a first value $N_{mi}$ and a second value $\Phi(N_{mi})$, where the first value $N_{mi} = N \cdot R \cdot S$ and where the second value $\Phi(N_{mi}) = \Phi(N) \cdot (R-1) \cdot (S-1)$, wherein the symbol $\Phi$ represents Euler's totient function. The method further includes selecting, at the requesting entity, fifth and sixth prime numbers T,U, and computing, at the requesting entity, a third value $N_m$ and a fourth value $d_m$, where $N_m = N_{mi} \cdot T \cdot U$, and where $d_m = (1 + K\Phi(N_m))/e$, wherein $\Phi(N_m) = \Phi(N_{mi}) \cdot (T-1) \cdot (U-1)$ and wherein K and $d_m$ are integers, whereby $d_m$ is adapted to be used by the requesting entity as the secret key counterpart of the public key value e with respect to the modulus $N_m$.

DETAIL DESCRIPTION OF THE INVENTION

As an aid to understanding the present invention, the mathematical principle underlying the invention will first be explained. Thus, the mathematical relationships established hereinabove for the case where $$N = P \cdot Q$$

is the product of two prime numbers are readily seen to be equally valid for the case where N is the product of more than two prime numbers, since for such a number N, all the integers I which are factors of N satisfy $$X^{I-1} = 1 \pmod{I}.$$

Thus, where, for example, $$N = P \cdot Q \cdot R \cdot S \cdot T \cdot U.$$

is the product of six prime numbers, then if $$X = Y^e \pmod{N}$$

then $$Y = X^d \pmod{N}$$

for all Y, $0 \leq Y < N$ provided that $$e \cdot d = 1 \pmod{\Phi(N)}$$

where $$\Phi(N) = (P-1) \cdot (Q-1) \cdot (R-1) \cdot (S-1) \cdot (T-1) \cdot (U-1)$$

A preferred embodiment of the invention will now be described in relation to a group of members or entities of which one specified member is a trusted member herein referred to as the "parent". For such a group of members, three problems are addressed herein:

1. Proof of group membership.

2. Protection of the individual member secret keys.

3. Easy derivation of the matching member public keys.

Figure 1:
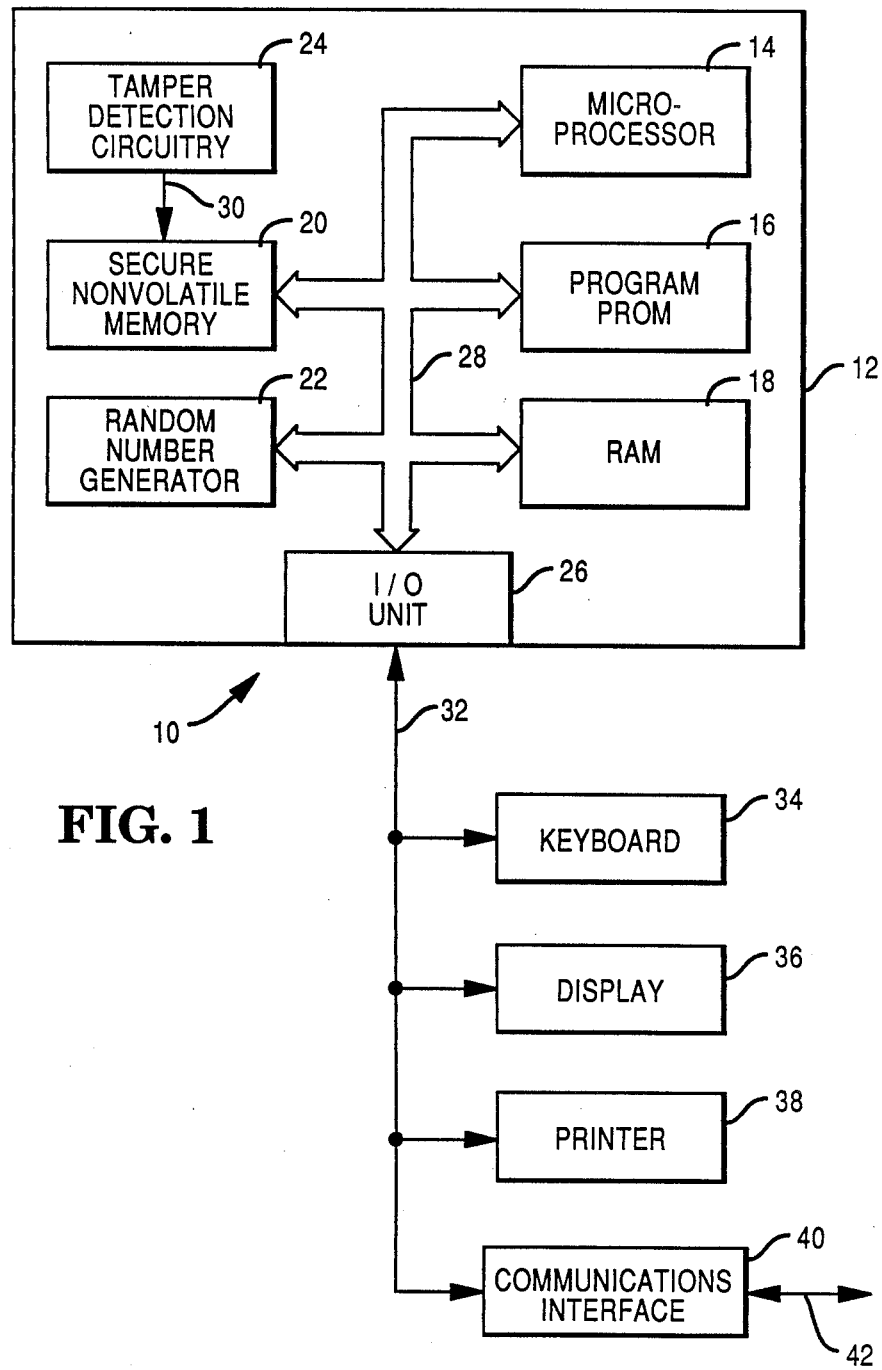
FIG. 1 is a block diagram of processing apparatus located at the group parent.

Referring now to FIG. 1, there is shown a block diagram of apparatus which is located at the parent. Such apparatus includes a security processor 10. The security processor 10 comprises a housing 12 which contains a microprocessor 14, a program PROM 16, a RAM (random access memory) working memory 18, a secure nonvolatile memory 20, a random number generator 22, tamper detection circuitry 24, and an input/output unit 26. The devices 14, 16, 18, 20, 22 and 26 are interconnected by an internal bus 28. The tamper detection circuitry 24 is adapted to detect any unauthorized tampering with the housing 12, such as an attempt to penetrate the housing, and to provide a reset signal over a line 30 to reset the secure nonvolatile memory 20 in response to the detection of such tampering. An example of a suitable security processor is described in more detail in U.S. Pat. No. 4,593,384.

The security processor 10 is connected over an external bus 32 to a plurality of peripheral devices, including a keyboard 34, which enables data to be manually entered, a display 36, a printer 38 which enables output data to be printed and a communications interface 40 (such as a modem), which enables communication with remote devices to take place over a channel 42.

Figure 2:
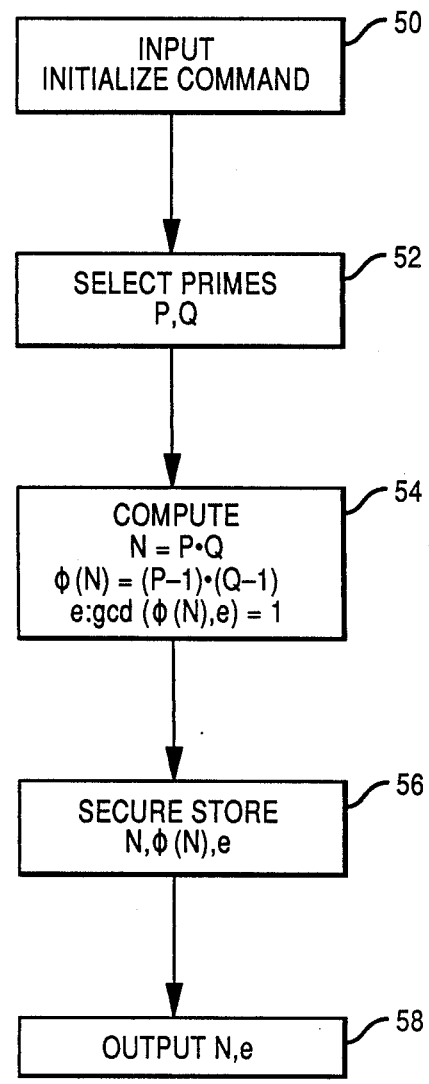
FIG. 2 is a flowchart illustrating a generation or setup phase of operation of the parent processing apparatus.

Referring now to FIG. 2, there is shown a flowchart for the security processor 10 located at the parent, during generation of a public key (e,N). In an initial input step, an initialize or set-up command is applied as shown at box 50, to condition the security processor 10 to perform the desired operation. Next, as shown at box 52, a routine provides for the selection of two large random prime numbers P and Q. Such routines are well known. For instance, odd random numbers of the desired size can be generated by the random number generator 22 and tested for primality by probabilistic testing methods, as explained in the aforementioned article by Rivest et al.

Next, as shown at box 54, three values are derived, namely the value N, which is the product of P and Q; the value $\Phi(N)$ which is the product of $P-1$ and $Q-1$; and a value e which is relatively prime to $\Phi(N)$, that is to say, such that the greatest common divisor (gcd) of e and $\Phi(N)$ is 1. Preferably e is a prime number, for a reason which will be explained hereinafter. Then, as shown at box 56, the values N, $\Phi(N)$ and e are stored in the secure nonvolatile memory 20, FIG. 1. The values N and e are now available in response to a suitable request signal applied to the security processor 10, as indicated at output box 58.

Figure 3:
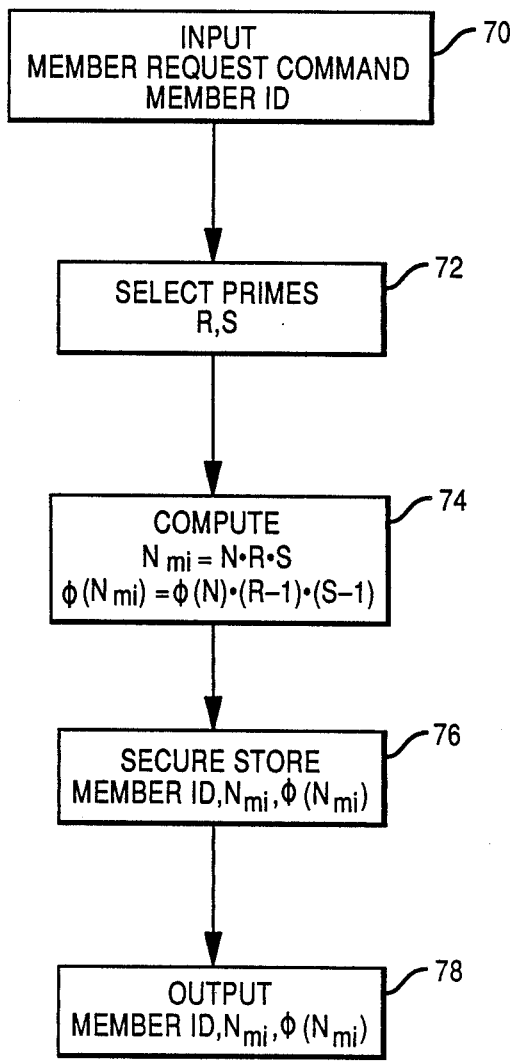
FIG. 3 is a flowchart illustrating an operational phase of the parent processing apparatus in response to a member request.

Referring to FIG. 3, there is shown a flowchart for the security processor 10 located at the parent during an operational phase, in response to a request signal supplied from a group member. Thus, as shown at box 70, the security processor 10 receives as an input, a member request command together with a member identification, ID, identifying the group member supplying the request.

Then, as shown at box 72, a routine provides for the selection of two large prime numbers R and S, different from the primes P and Q. Next, as shown at box 74, a value $N_{mi}$ is computed, which is the product of N, R and S:

$$N_{mi} = N \cdot R \cdot S.$$

and also the value $\Phi(N_{mi})$, where $$\Phi(N_{mi}) = \Phi(N) \cdot (R-1) \cdot (S-1).$$

Next, as shown at box 76, the value of the member ID is stored in the secure memory 20, together with the values of $N_{mi}$, $\Phi(N_{mi})$. These stored values are now available for output from the security processor 10, as shown at box 78, and may be displayed, printed or supplied to a security processor 110, FIG. 4, located at the requesting member, which will now be described.

Figure 4:
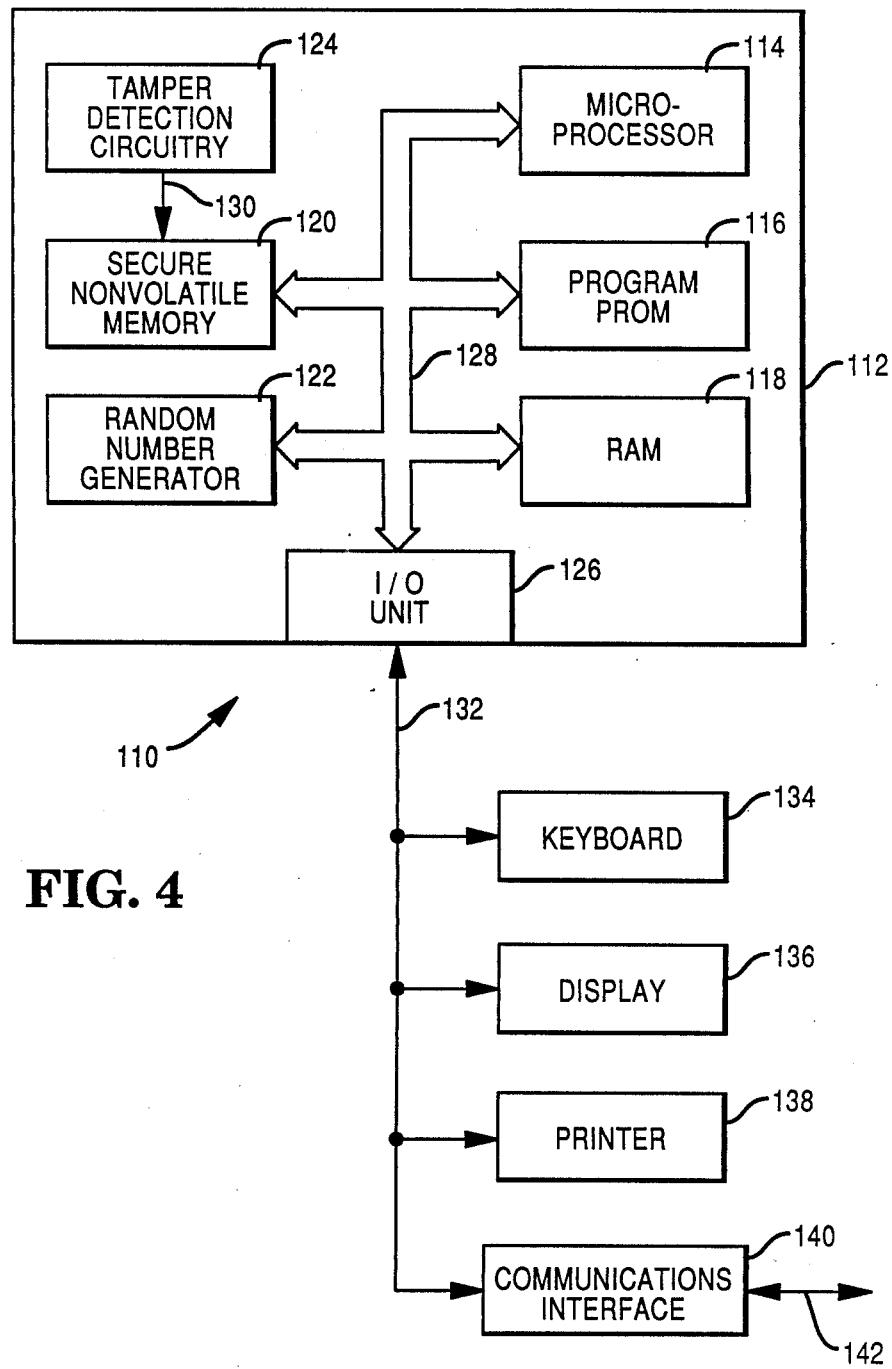
FIG. 4 is a block diagram of processing apparatus located at a group member.

Referring to FIG. 4, there is shown a block diagram of apparatus which is located at each member of the group. The provided apparatus is similar to the apparatus located at the parent, and described hereinabove with reference to FIG. 1. Thus, the member apparatus includes a security processor 110, having a housing 112 which contains a microprocessor 114, a program PROM 116, a RAM working memory 118, a secure nonvolatile memory 120, a random number generator 122, tamper detection circuitry 124 and an input/output unit 126. An internal bus 128 interconnects the various devices as shown in FIG. 4. The tamper detection circuitry 124 can issue a reset signal over a line 130 in response to the detection of an attempt to penetrate the housing 112. Reference is again directed to U.S. Pat. No. 4,593,384 for a more detailed description of a suitable security processor. The security processor 110 is connected over an external bus 132 to a keyboard 134, a display 136, a printer 138 and a communications interface 140, enabling communication with remote devices to take place over a channel 142.

Figure 5:
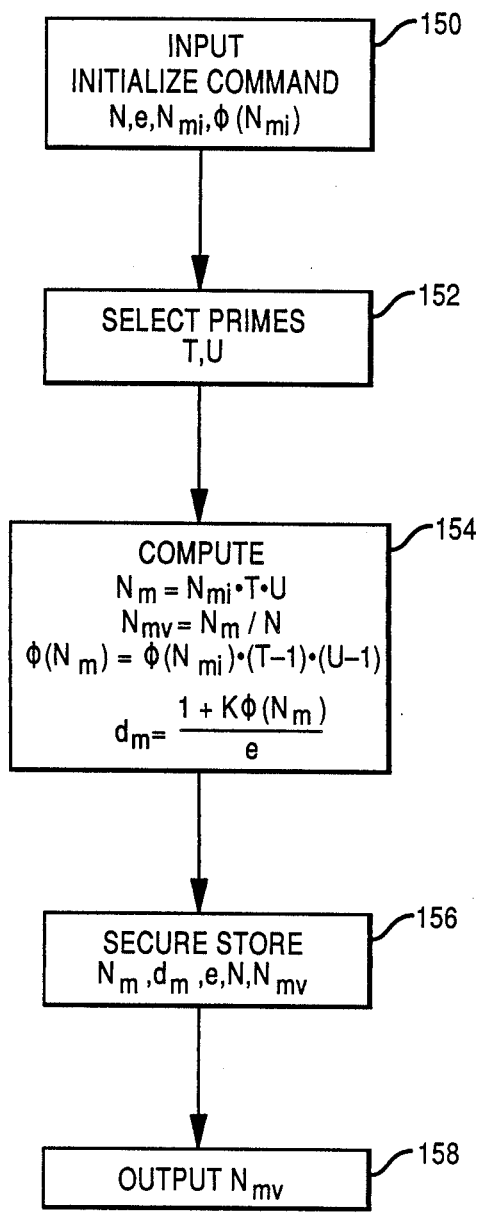
FIG. 5 is a flowchart illustrating a generation phase of operation for the member processing apparatus.

Referring now to FIG. 5, there is shown a flowchart for the security processor 110 located at the group member, during a key generation phase for the group member. Initially, an initialize command is supplied to the processor 110, together with the values N,e, $N_{mi}$ and $\Phi(N_{mi})$, which may be derived from a cipher generated by the security processor 10 at the parent and transmitted over the channels 42 and 142 to the security processor 110. Next, as shown at box 152, a routine is effected to select two large prime numbers T and U. It should be understood that all the prime numbers P, Q, R, S, T, U should be different. The parent selects P, Q, R and S and can ensure their difference. However, the member does not know these values and could accidentally select T or U equal to P, Q, R or S. For large primes this probability is remote. However, for smaller primes the probability may be of concern. This probability may be avoided by the parent supplying to the security processor 110 a magnitude boundary for T, U values. For example, if $$P, Q, R, S > 2^{150}$$

then $$T, U < 2^{150}$$

It should further be understood that, in order not to restrict the choice of primes at the member, the value of e initially selected by the parent should be a prime number, thereby ensuring the relative primality of e with respect to any $\Phi(N_m)$ value.

Next, as shown at box 154, four values are computed. Firstly, a value $N_m$, which is the product of $N_{mi}$, T and U:

$$N_m = N_{mi} \cdot T \cdot U.$$

Secondly, by dividing $N_m$ by N, a value $N_{mv}$ is computed:

$$N_{mv} = N_m / N$$

The value $N_{mv}$ will be referred to herein as the "member variant". Thirdly, the value $\Phi(N_m)$ is computed as the product of $\Phi(N_{mi})$, $T-1$ and $U-1$:

$$\Phi(N_m) = \Phi(N_{mi}) \cdot (T-1) \cdot (U-1).$$

Finally, an integer $d_m$ is computed from the formula $$d_m = [1 + K\Phi(N_m)]/e$$

In this formula, K is an integer value desirably selected such that $d_m$ which is the member's secret key, is the smallest integer computable from the formula. It is pointed out that steps 152 and 154, carried out at the member processor 110 have the effect of preventing the parent from determining the member's $\Phi(N_m)$, and hence the member's secret key, since the parent would need to factor $T \cdot U = N_m/N_{mi}$ in order to obtain $T-1$ and $U-1$, and such factoring is infeasible with T and U being suitably large prime numbers. Similarly the member, knowing N, $N_{mi}$ and $\Phi(N_{mi})$ cannot feasibly determine the parent $\Phi(N)$ and thus P, Q, since this requires the factoring of $R \cdot S = N_{mi}/N$. Thus, it will be appreciated that the value $\Phi(N_m)$ is sourced from a "seed value" N, but is "doubly diversified" to prevent calculation by any person or entity other than the member owner, who may only derive a legitimate $\Phi(N_m)$ and thus a legitimate $d_m$ by utilizing the values supplied by the parent.

Returning now to FIG. 5, at box 156, the values $N_m$, $d_m$, e, N, and $N_{mv}$ are stored in the secure nonvolatile memory 120. Finally, at box 158, the member variant value $N_{mv}$ is supplied as an output, for printing, display and/or remote transmission. This member variant value is "published" or made available upon request, and the member's public key modulus can be readily derived by multiplying $N_{mv}$ by N:

$$N_m = N_{mv} \cdot N.$$

Thus, the member has the public key (e, $N_m$), with the corresponding secret key counterpart being $d_m$. However, the member variant value $N_{mv}$ rather than $N_m$ itself is published by the member.

With the above in mind, it will be appreciated that the authenticity of data Y emanating from the member may be established by the member digitally signing the data with $d_m$, such that $$X = Y^{d_m} \pmod{N_m}$$

and that such signature X may be verified by any entity (whether a member of the group or not) by calculating $$Y = Y^e \pmod{N \cdot N_{mv}}$$

This procedure not only determines the validity of the signature supplied by the member via $N_{mv}$, but also determines valid membership of the group via N. Consequently, if proof of group membership is established, then the value $N_{mv}$ may be trusted, even though it may be unknown immediately prior to the authenticity test. It can therefore be delivered with the digital signature, obviating the need for any prior knowledge by the signature verifier except for the published group N and e values.

Furthermore, enciphered data Y can be feasibly deciphered only by the member by utilizing mod $N_m$ exponentiation to the power $d_m$ provided that the transmitter of such enciphered data utilizes the group public e value and the N value modified by the member variant $N_{mv}$.

Figure 6:
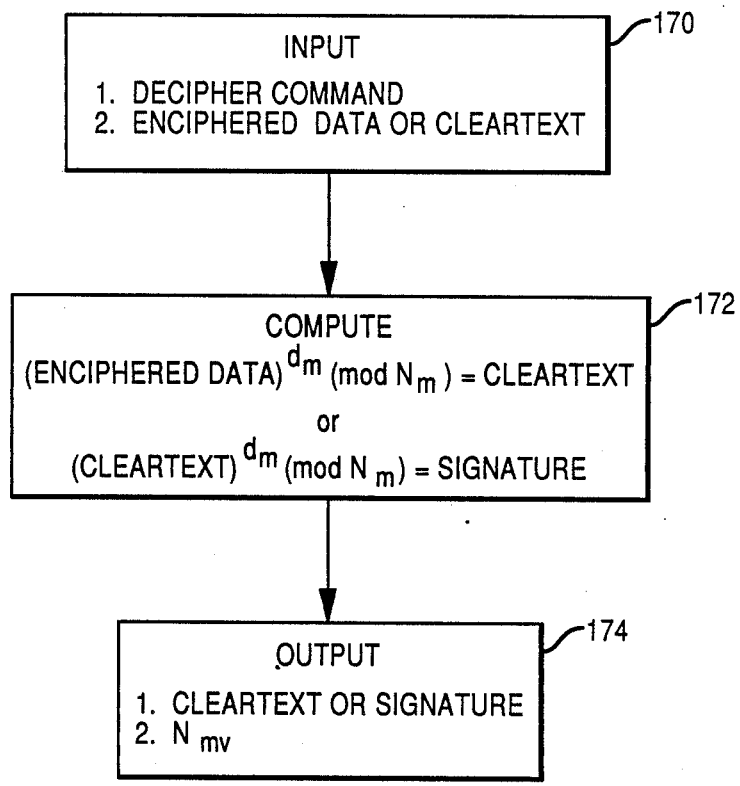
FIG. 6 is a flowchart illustrating an operational phase of the member processing apparatus.

Referring now to FIG. 6, there is shown a flowchart for the operational phase of the member security processor 110. Thus, as shown at box 170, there is input a decipher command, together with enciphered data or cleartext. As shown at box 172, the input data is raised to the exponent power $d_m$, using the member's stored secret key $d_m$, and the result expressed as a residue, mod $N_m$, using the member's public key modulus value $N_m$, thereby providing cleartext or a digital signature. Finally, as shown at box 174, the provided cleartext or digital signature is made available as an output signal for printing, display or remote transmission, together with the member variant value $N_{mv}$.

Figure 7:
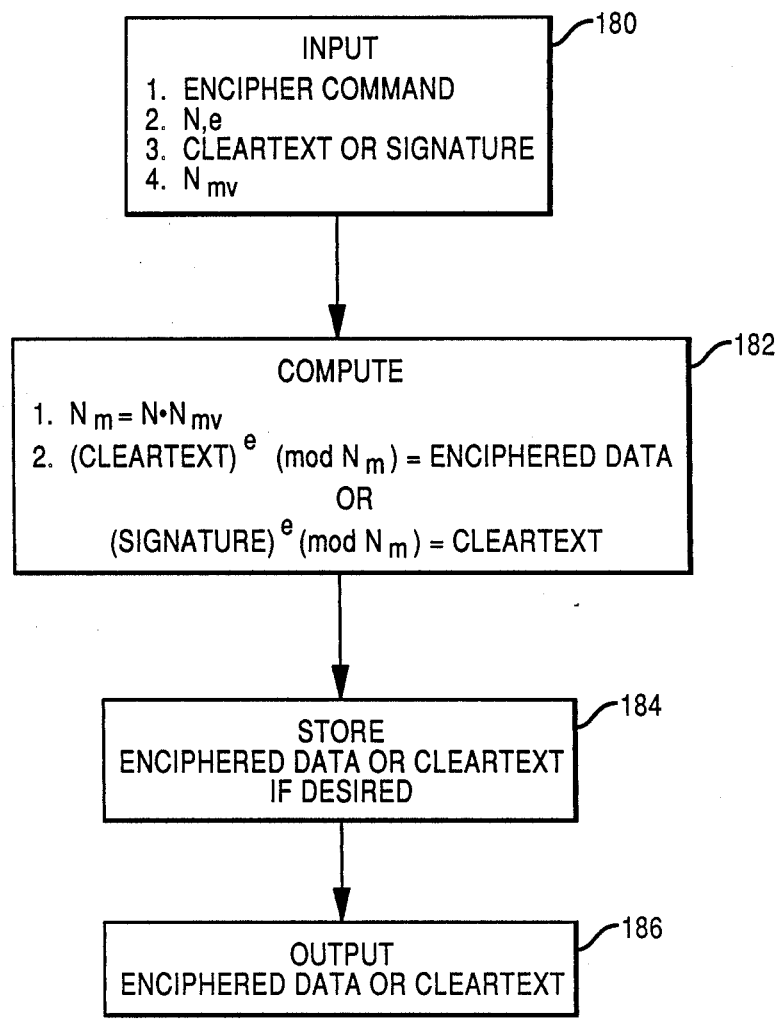
FIG. 7 is a flowchart illustrating an operational phase for an entity communicating with a group member.

It will be appreciated from the above that communication with a group member can be established by an entity which is not a group member. Communication by such an entity is illustrated in the flowchart shown in FIG. 7, it being understood that the entity has a conventional processor, such as a PC (personal computer), including computing and storage facilities. Thus, box 180 shows an input as comprising an encipher command, the values N and e, which are supplied by the group parent, or derived from published lists, input data in the form of cleartext or a signature, and a member variant value $N_{mv}$ corresponding to the member with which the entity desires to communicate. Next, as shown at box 182, the product of $N_{mv}$ and N is computed to produce $N_m$, which is the public key modulus of the communicating group member. Then, the input data (cleartext or signature) is subject to exponentiation to the power e, modulo $N_m$ to produce enciphered data or cleartext, such computed data being stored if desired, as shown at box 184. The enciphered data or cleartext are then available to be provided as output signals, as shown at box 186.

An advantage of the arrangement described herein is that a forger knowing N cannot feasibly calculate a suitable $N_{mv}$ and matching $d_m$ to produce a valid signature without knowledge of a suitable 101 ($N_m$). Note that:

$$d_m = [1 + K\Phi(N_m)]/e$$

$$\Phi(N_m) = \Phi(N) \cdot \Phi(N_{mv}).$$

Although $\Phi(N_{mv})$ can be determined by a forger selecting his own $N_{mv}$, to calculate $\Phi(N)$ requires a knowledge of P and Q. These values are known only to the parent, and are kept secret. Thus, provided that the secrecy of P and Q can be maintained, a forger can be defeated.

As a further safeguard, to protect against the accidental disclosure of a member's $\Phi(N_{mi})$, the parent or group may decide to publish or make readily available the $N_{mv}$ values of all the group members, thus precluding fraudulent $N_{mv}$ values from being used.

Further, one member cannot masquerade as another member because the correct $d_m$ requires knowledge of $\Phi(N_{mi})$ and it is not possible to determine another member's $\Phi(N_{mi})$ without knowledge of $\Phi(N)$ and the member's R and S values. All these values are kept secret by the parent.

Thus, by virtue of the key values generated by the present invention and the diversification between the member and parent keys, each group member is protected from other members, yet can prove both himself specifically and his membership of the group generally. Even the group parent cannot masquerade as another member.

The invention is therefore suitable in environments such as an international transaction card association which may have many thousands of card issuing members. Each of these card issuers could secure himself from forgery of his cards without the need to previously disclose the information required to establish the authenticity of his cards to various authenticators such as card accepting merchants. The card acceptor need only have prior knowledge of the association's global values N and e in order to readily determine the authenticity of the card. The card would need to carry and disclose as required the member's variant $N_{mv}$ and a value which may be determined as having been produced by the utilization of the member's specific secret key $d_m$. The card acceptor could then unsign that value and compare it to a known value appropriate for that card or transaction.

It will be clear to those skilled in the art that the present invention is not limited to the specific embodiments disclosed and illustrated herein. Nor is it limited in application to smart cards. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method of generating key values for use in public key cryptography by a requesting entity, including the step of generating at a parent entity, public key values N, e, where N is the product of first and second prime numbers P,Q and e is a corresponding public key integer value, comprising:

selecting, at said parent entity, third and fourth prime numbers R,S;

transmitting to said requesting entity a first value $N_{mi}$ and a second value $\Phi(N_{mi})$ where said first value $N_{mi} = N \cdot R \cdot S$ and where said second value $\Phi(N_{mi}) = \Phi(N) \cdot (R-1) \cdot (S-1)$, wherein the symbol $\Phi$ represents Euler's totient function;

selecting, at said requesting entity, fifth and sixth prime numbers, T,U; and computing, at said requesting entity, a third value $N_m$ and a fourth value $d_m$, where $N_m = N_{mi} \cdot T \cdot U$, and where $d_m = [1 + K \ \Phi(N_m)]/e$;

wherein $\Phi(N_m) = \Phi(N_{mi}) \cdot (T-1) \cdot (U-1)$; and wherein K and $d_m$ are integers, whereby $d_m$ is adapted to be used by said requesting entity as a secret key counterpart of the public key value e with respect to $N_m$.

2. A method according to claim 1 wherein said parent entity includes storage means, said method further comprising:

storing the values of N, $\Phi(N)$ and e in said storage means.

3. A method according to claim 2, further comprising:

storing in said storage means an identification code identifying said requesting entity, said first value $N_{mi}$ and said second value $\Phi(N_{mi})$.

4. A method according to claim 3 wherein said requesting entity includes further storage means, said method further comprising:

computing, at said requesting entity, a fifth value $N_{mv}$, where $N_{mv} = N_m/N$; and storing said fifth value in said further storage means.

5. A method according to claim 4, further comprising:

multiplying the value $N_{mv}$ by the value N to yield the value $N_m$, utilization of which, with the value e, enables the verification of digital signatures.

6. A method according to claim 6 wherein said public key integer value e is a prime number.

7. A method according to claim 4, further comprising:

multiplying the value $N_{mv}$ by the value N to yield the value $N_m$, utilization of which, with the value e, enables the enciphering of data.

8. A method according to claim 1 wherein said public key integer value e is a prime number.

* * * * *

UNITED STATES PATENT AND TRADEMARK OFFICE
CERTIFICATE OF CORRECTION

PATENT NO. : 4,944,007

DATED : July 24, 1990

INVENTOR(S) : Jeffrey R. Austin

Page 1 of 2

It is certified that error appears in the above-identified patent and that said Letters Patent is hereby corrected as shown below:

Column 7, line 60, delete "Y" immediately following = and substitute --X--.

Column 8, line 48, delete "101" and substitute --$\phi$--.

Column 10, line 32, delete "5" at beginning of claim and substitute --6--.

Column 10, line 37, delete "6" at beginning of claim and substitute --5--.

Columm 10, line 37, delete reference to claim "6" appearing immediately after the word claim and substitute --1--.

Column 10, line 39, delete "7" at beginning of claim and substitute --8--.

Column 10, line 44, delete "8" at beginning of claim and substitute --7--.

UNITED STATES PATENT AND TRADEMARK OFFICE
CERTIFICATE OF CORRECTION

PATENT NO. : 4,944,007

DATED : July 24, 1990

INVENTOR(S) : Jeffrey R. Austin

It is certified that error appears in the above-identified patent and that said Letters Patent is hereby corrected as shown below:

Column 10, line 44, delete reference to claim "1" appearing immediately after the word claim and substitute --6--.

Signed and Sealed this

Twelfth Day of May, 1992

Attest:

DOUGLAS B. COMER

*Attesting Officer*      *Acting Commissioner of Patents and Trademarks*